(12) United States Patent
Depape et al.

(10) Patent No.: US 11,691,724 B2
(45) Date of Patent: Jul. 4, 2023

(54) SYSTEMS AND METHODS FOR CONTROLLING ROTOR TILT FOR A VERTICAL TAKE-OFF AND LANDING AIRCRAFT

(71) Applicant: Archer Aviation, Inc., San Jose, CA (US)

(72) Inventors: Pieter Depape, San Francisco, CA (US); Geoffrey C. Bower, Sunnyvale, CA (US)

(73) Assignee: Archer Aviation, Inc., San Jose, CA (US)

( * ) Notice: Subject to any disclaimer, the term of this patent is extended or adjusted under 35 U.S.C. 154(b) by 61 days.

(21) Appl. No.: 17/343,355

(22) Filed: Jun. 9, 2021

(65) Prior Publication Data

US 2022/0396355 A1    Dec. 15, 2022

(51) Int. Cl.
*B64C 29/00* (2006.01)

(52) U.S. Cl.
CPC ................ *B64C 29/0033* (2013.01)

(58) Field of Classification Search
CPC .................................................. B64C 29/0033
See application file for complete search history.

(56) References Cited

U.S. PATENT DOCUMENTS

| | | | | |
|---|---|---|---|---|
| 1,867,963 | A * | 7/1932 | Blahnik | B64C 29/0033 244/7 C |
| 3,514,052 | A * | 5/1970 | McKeown | B64C 29/0033 416/102 |
| 6,276,633 | B1* | 8/2001 | Balayn | B64C 29/0033 244/56 |
| 7,147,182 | B1* | 12/2006 | Flanigan | B64C 29/0033 244/6 |
| 10,589,838 | B1* | 3/2020 | Suppes | B64D 35/04 |
| 2007/0241228 | A1* | 10/2007 | Haynes | B64C 29/0033 244/7 A |
| 2020/0331602 | A1* | 10/2020 | Mikic | B64C 11/303 |
| 2021/0253234 | A1* | 8/2021 | Tao | B64C 29/0025 |
| 2022/0089279 | A1* | 3/2022 | Rosen | B64C 39/024 |
| 2022/0126996 | A1* | 4/2022 | Long | B60L 3/0092 |
| 2022/0194572 | A1* | 6/2022 | Choi | B64C 29/0033 |

* cited by examiner

*Primary Examiner* — Tien Q Dinh
*Assistant Examiner* — William L Gmoser
(74) *Attorney, Agent, or Firm* — Morrison & Foerster LLP (57) ABSTRACT

A rotor mounting assembly for a vertical take-off and landing aircraft includes a boom configured for mounting to a wing of the aircraft; a mount for mounting a rotor assembly, the mount connected to the boom at a joint and tiltable about the joint from a forward thrust orientation in which the rotor assembly can provide forward thrust for forward flight to a vertical thrust orientation in which the rotor assembly can provide vertical thrust for vertical take-off and landing and hover; a multi-link assembly extending from the boom to the mount; and a rotary actuator for actuating the multi-link assembly to control tilting of the mount.

21 Claims, 13 Drawing Sheets

SYSTEMS AND METHODS FOR CONTROLLING ROTOR TILT FOR A VERTICAL TAKE-OFF AND LANDING AIRCRAFT

FIELD

This disclosure generally relates to vertical take-off and landing aircraft, and more specifically to fixed wing vertical take-off and landing aircraft.

BACKGROUND

Vertical take-off and landing (VTOL) aircraft are aircraft that can take-off and land vertically and hover, providing the ability to carry travelers directly to their destination. Helicopters are VTOL aircraft that generate lift entirely through their rotors. Some VTOL aircraft have wings and propulsion systems that enable the wings to provide the lift required during forward flight. Some winged VTOL aircraft use separate propulsion systems for vertical thrust for use during take-off and landing and forward thrust for use during cruising. Other winged VTOL aircraft use tiltable propulsion systems that tilt between vertical thrust and forward thrust positions. Tilt mechanisms for tiltable propulsion systems must be strong enough to actuate the propulsion system during high load operating regimes, such as during vertical flight, and must have the stiffness needed to ensure positional accuracy of the propulsion system. These requirements often lead to bulky tilt mechanisms that can add considerable weight to the aircraft and can be difficult to access for inspection and maintenance.

SUMMARY

According to various embodiments, a tilt mechanism for a vertical take-off and landing aircraft includes a rotor assembly mounted to a boom of the aircraft at a pivot joint and a multi-link assembly that extends from the boom to the mount and is actuated by a rotary actuator coupled to the multi-link assembly. The multi-link assembly is configured to provide a mechanical advantage to the rotary actuator such that the rotary actuator can be smaller, lighter, and draw less power than a rotary actuator located at the joint rotational axis. In some embodiments the multi-link assembly forms a portion of a four-bar linkage that provides an ideal balance of mechanical advantage, stiffness, and compactness.

According to various embodiments, a rotor mounting assembly for a vertical take-off and landing aircraft includes a boom configured for mounting to a wing of the aircraft; a mount for mounting a rotor assembly, the mount connected to the boom at a joint and tiltable about the joint from a forward thrust orientation in which the rotor assembly can provide forward thrust for forward flight to a vertical thrust orientation in which the rotor assembly can provide vertical thrust for vertical take-off and landing and hover; a multi-link assembly extending from the boom to the mount; and a rotary actuator for actuating the multi-link assembly to control tilting of the mount.

In any of these embodiments, the multi-link assembly can be configured to have a mechanical advantage that is highest when the mount is in the forward thrust orientation.

In any of these embodiments, the multi-link assembly may include a crank arm rotatably connected to the actuator and a coupler arm mounted to the mount, wherein the crank arm is shorter than the coupler arm.

In any of these embodiments, the crank arm may extend rearward of a connection between the crank arm and the actuator when the mount is in the forward thrust orientation and forward of the connection between the crank arm and the actuator when the mount is in the vertical thrust orientation.

In any of these embodiments, a rotational axis of the joint may be positioned above a rotational axis of a rotor assembly when the rotor assembly is mounted to the mount.

In any of these embodiments, the mount may include a shell that aligns with the boom when the mount is in the forward thrust orientation, the shell may be spaced from the boom when the mount is in the vertical thrust orientation, and the multi-bar linkage may be accessed through the spacing between the shell and the boom.

In any of these embodiments, the rotor mounting assembly may include a rotational position sensor located at the joint.

In any of these embodiments, a range of tilt of the mount about the joint may be at least 90 degrees.

In any of these embodiments, the actuator may include a gear box.

In any of these embodiments, the rotor mounting assembly may include at least one mechanical stop positioned at the joint for limiting a tilt range of the mount.

In any of these embodiments, the at least one mechanical stop positioned at the joint may limit upward tilt of the mount and at least one second mechanical stop limits downward tilt of the mount.

In any of these embodiments, the rotor mounting assembly may include the rotor assembly.

According to various embodiments, a vertical take-off and landing aircraft includes any of the rotor mounting assemblies above.

In any of these embodiments, the boom may be mounted to a wing.

In any of these embodiments, the aircraft may include a control system for controlling tilt of the mount, wherein the control system may actively control the tilt of the mount when the mount is in the vertical thrust orientation.

In any of these embodiments, the rotor assembly may be mounted to a foreword end of the boom and an aft rotor assembly may be non-tiltably mounted to the aft end of the boom.

According to various embodiments, a method of controlling a vertical take-off and landing aircraft includes controlling tilt of a rotor assembly between a forward thrust orientation in which the rotor assembly can provide forward thrust for forward flight and a vertical thrust orientation, wherein the rotor assembly is mounted to a mount that is connected to a boom of the aircraft at a joint, and the tilt is controlled by actuating a rotary actuator coupled to a multi-link assembly that extends from the boom to the mount.

In any of these embodiments, the tilt of the rotor assembly may be controlled based on an output from at least one rotational sensor located at the joint.

In any of these embodiments, the method may include actively controlling the tilt of the rotor assembly during hover.

In any of these embodiments, the method may include locking the tilt of the rotor assembly during cruise.

BRIEF DESCRIPTION OF THE DRAWINGS

The invention will now be described, by way of example only, with reference to the accompanying drawings, in which.

DETAILED DESCRIPTION

As discussed further herein, systems and methods for controlling the tilt of a proprotor of a vertical take-off and landing aircraft include a tilt mechanism that includes a multi-link assembly driven by a rotary actuator for tilting the proprotor between a vertical thrust orientation used during hover and a forward thrust orientation used during cruise. Rotation of the rotary actuator causes extension and retraction of the multi-link assembly that tilts the proprotor about a joint between the proprotor and a support structure for the proprotor, such as a boom mounted to the wing of a VTOL aircraft. According to various embodiments, the tilt mechanism is configured to provide variable mechanical advantage that is tuned to balance reduced rotary actuator power requirements with tilt mechanism stiffness that is needed to ensure proprotor positional accuracy in the hover orientation. According to various embodiments, the proprotor is configured such that when the proprotor is in the vertical thrust orientation, an access opening is created between the proprotor shell and the boom shell that can allow easy access to the compact tilt mechanism for inspection, repair, and replacement.

In the following description of the disclosure and embodiments, reference is made to the accompanying drawings in which are shown, by way of illustration, specific embodiments that can be practiced. It is to be understood that other embodiments and examples can be practiced, and changes can be made, without departing from the scope of the disclosure.

In addition, it is also to be understood that the singular forms "a," "an," and "the" used in the following description are intended to include the plural forms as well, unless the context clearly indicates otherwise. It is also to be understood that the term "and/or," as used herein, refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units, but do not preclude the presence or addition of one or more other features, integers, steps, operations, elements, components, units, and/or groups thereof.

As used herein, the term "proprotor" refers to a variable tilt rotor that can provide thrust for vertical lift and for forward propulsion by varying the tilt of the rotor.

Figure 1A:
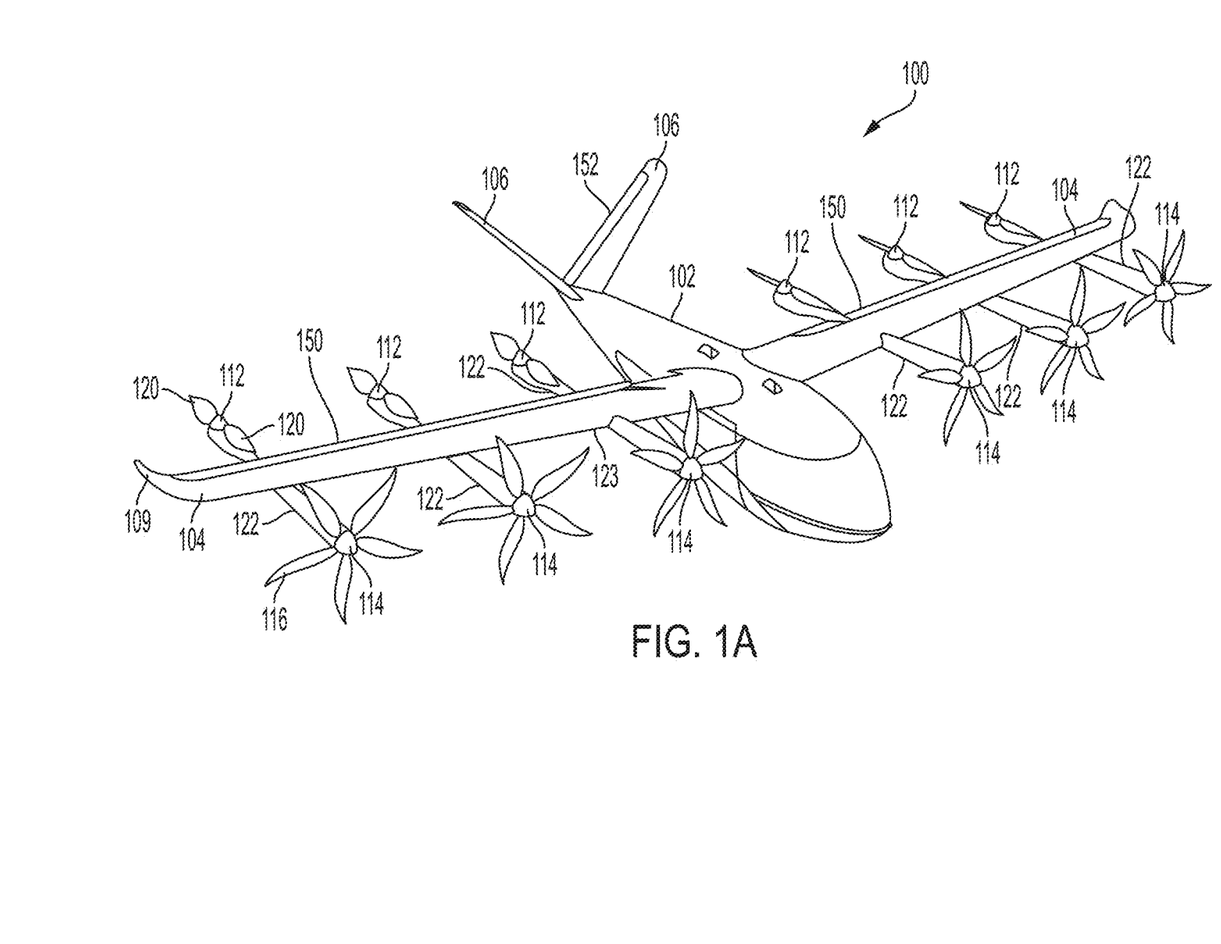
FIGS. 1A and 1B illustrate an electric VTOL aircraft in a cruise configuration and a vertical take-off and landing configuration, respectively, according to various embodiments.
Figure 1B:
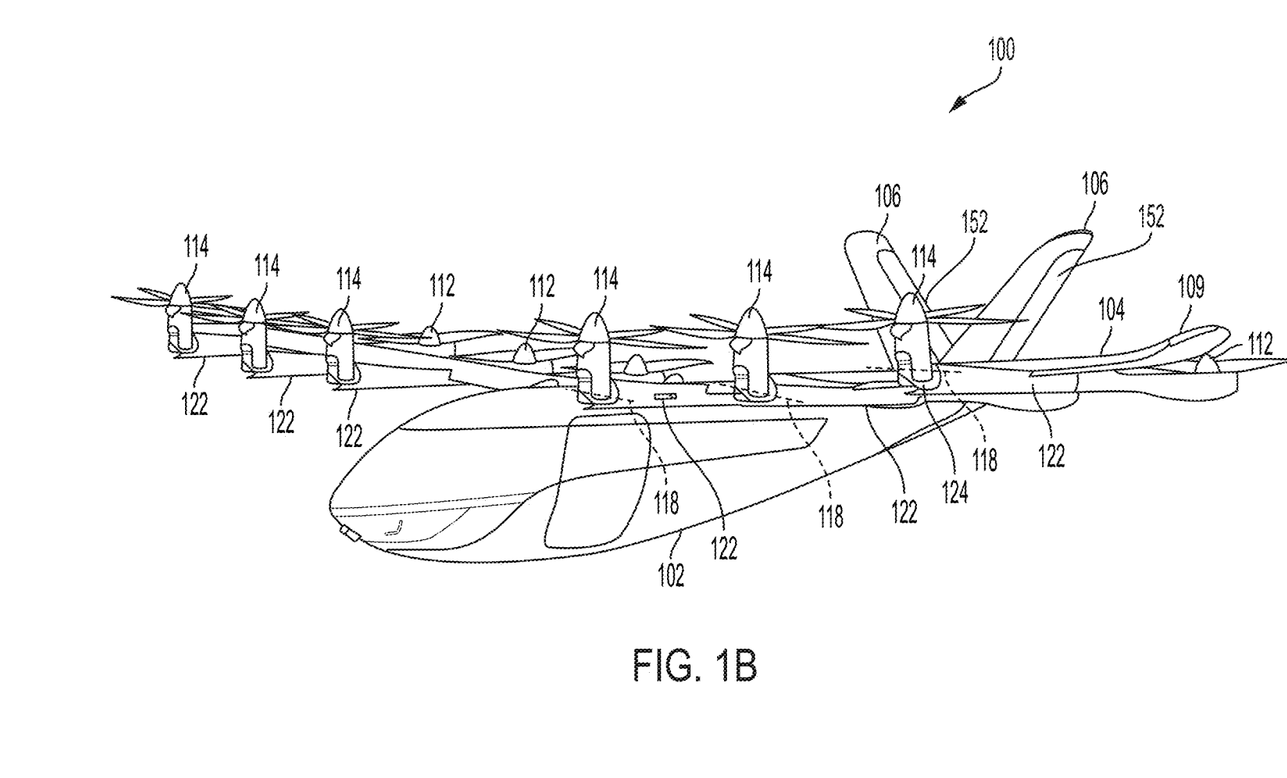

FIGS. 1A and 1B illustrate an electric VTOL aircraft 100 in a cruise configuration and a vertical take-off and landing configuration, respectively, according to various embodiments. The aircraft 100 includes a fuselage 102, wings 104 mounted to the fuselage 102, and one or more rear stabilizers 106 mounted to the rear of the fuselage 102. The aircraft 100 includes a plurality rotors 112 and a plurality of proprotors 114 (collectively referred to herein as EPUs). The EPUs (112, 114) generally include an electric motor driving a plurality of blades and a motor controller for controlling/powering the motor. In some embodiments, the pitch of the blades of one or more of the EPUs can be controlled in-flight.

Rotors 112 are mounted to the wings 104 and are configured to provide lift for vertical take-off and landing. Proprotors 114 are mounted to the wings 104 and are tiltable between lift configurations in which they provide a portion of the lift required for vertical take-off and landing and hovering, as shown in FIG. 1B, and forward thrust configurations in which they provide forward thrust to the aircraft 100 for horizontal flight, such as cruise, as shown in FIG. 1A. As used herein, a proprotor lift configuration or vertical thrust configuration or orientation refers to any proprotor orientation in which the proprotor thrust is providing primarily lift to the aircraft and a proprotor forward thrust configuration or orientation refers to any proprotor orientation in which the proprotor thrust is providing primarily forward thrust to the aircraft.

According to various embodiments, the rotors 112 are configured for providing lift only, with all forward thrust being provided by the proprotors. Accordingly, the rotors 112 may be in fixed positions. During take-off and landing, the proprotors 114 are tilted to lift configurations in which their thrust is directed upward to provide additional lift. In some embodiments, the rotors 112 are tiltable for thrust vectoring. In some embodiments, rotors 112 are proprotors.

For forward flight, the proprotors 114 tilt from their lift configurations to their forward thrust configurations. In other words, the tilt of the proprotors 114 is varied from a range of tilt positions in which the proprotor thrust is directed upward to provide lift during vertical take-off and landing and during hover to a range of tilt positions in which the proprotor thrust is directed forward to provide forward thrust to the aircraft 100. The proprotors tilt about axes 118 that are perpendicular to the forward direction of the aircraft 100. When the aircraft 100 is in full forward flight, lift may be provided entirely by the wings 104, and the rotors 112 may be shut off. The blades 120 of the rotors 112 may be locked in a low drag position for aircraft cruising. In some embodiments, the rotors 112 each have two blades 120 that are locked for cruising in minimum drag positions in which one blade is directly in front of the other blade as illustrated in FIG. 1A. In some embodiments, the rotors 112 have more than two blades. In some embodiments, the proprotors 114 include more blades 116 than the rotors 112. For example, as illustrated in FIGS. 1A and 1B, the rotors 112 may each include two blades and the proprotors 114 may each include five blades. According to various embodiments, the proprotors 114 can have from 2 to 5 blades.

According to various embodiments, the aircraft includes only one wing 104 on each side of the fuselage 102 (or a single wing that extends across the entire aircraft) and at least a portion of the rotors 112 are located rearward of the wings 104 and at least a portion of the proprotors 114 are located forward of the wings 104. In some embodiments, all of the rotors 112 are located rearward of the wings 104 and all of the proprotors are located forward of the wings 104. According to some embodiments, all rotors 112 and proprotors 114 are mounted to the wings—i.e., no rotors or proprotors are mounted to the fuselage. According to various embodiments, the rotors 112 are all located rearward of the wings 104 and the proprotors 114 are all located forward of the wings 104. According to some embodiments, all rotors 112 and proprotors 114 are positioned inward of the wing tips 109.

According to various embodiments, the rotors 112 and proprotors 114 are mounted to the wings 104 by booms 122. The booms 122 may be mounted beneath the wings 104, on top of the wings, and/or may be integrated into the wing profile. According to various embodiments, one rotor 112 and one proprotor 114 are mounted to each boom 122. The rotor 112 may be mounted at a rear end of the boom 122 and a proprotor 114 may be mounted at a front end of the boom 122. In some embodiments, the rotor 112 is mounted in a fixed position on the boom 122. In some embodiments, the proprotor 114 is mounted to a front end of the boom 122 via a hinge 124. The proprotor 114 may be mounted to the boom 122 such that the proprotor 114 is aligned with the body of the boom 122 when in its forward thrust configuration, forming a continuous extension of the front end of the boom 122 that minimizes drag for forward flight.

According to various embodiments, the aircraft 100 may include multiple wings on each side of the aircraft 100, only one wing on each side of the aircraft 100, or a single wing that extends across the aircraft 100. According to some embodiments, at least one wing 104 is a high wing mounted to an upper side of the fuselage 102. According to some embodiments, the wings include control surfaces 150, such as flaps and/or ailerons, which are positioned via one or more control surface actuators (not shown). According to some embodiments, the wings can have curved wing tips 109 for reduced drag during forward flight. According to some embodiments, the rear stabilizers 106 include control surfaces 152, such as one or more rudders, one or more elevators, and/or one or more combined rudder-elevators that are positioned via one or more control surface actuators (not shown). The wing(s) may have any suitable design. In some embodiments, the wings have a tapering leading edge 123, as shown for example, in the embodiment of FIG. 1A. In some embodiments, the wings have a tapering trailing edge.

Figure 2A:
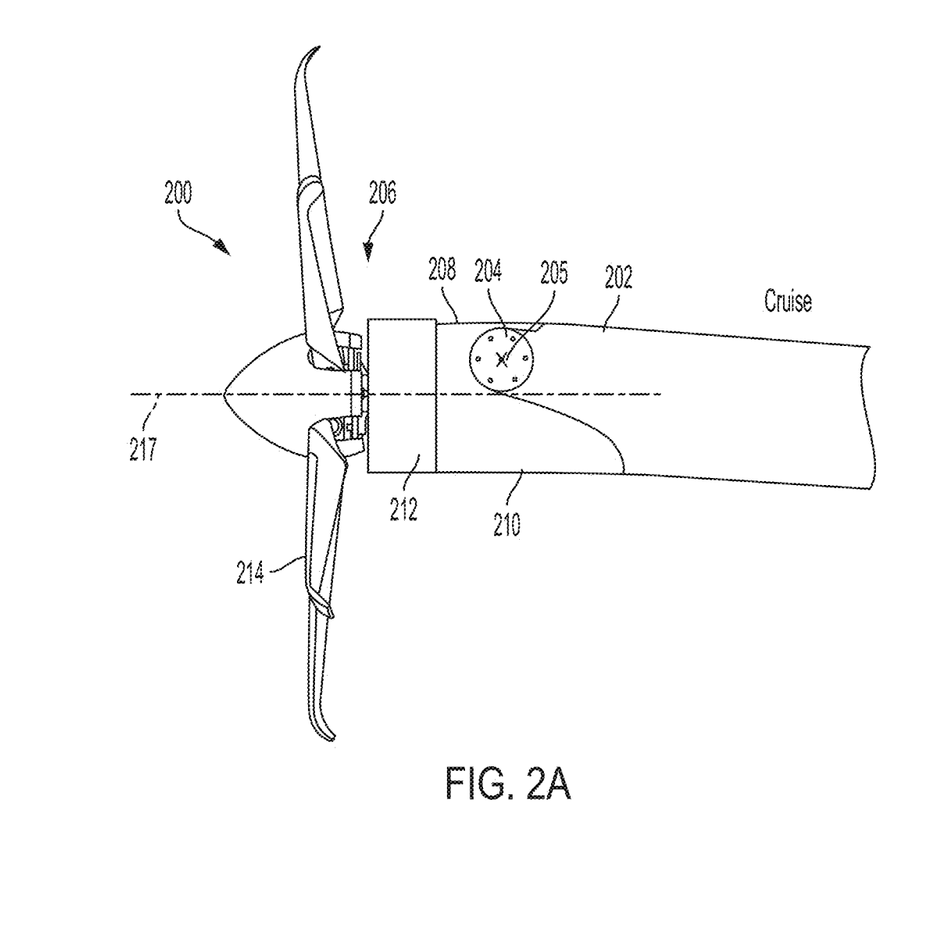
FIGS. 2A and 2B illustrate aspects of the mounting of a proprotor to a boom, according to various embodiments.
Figure 2B:
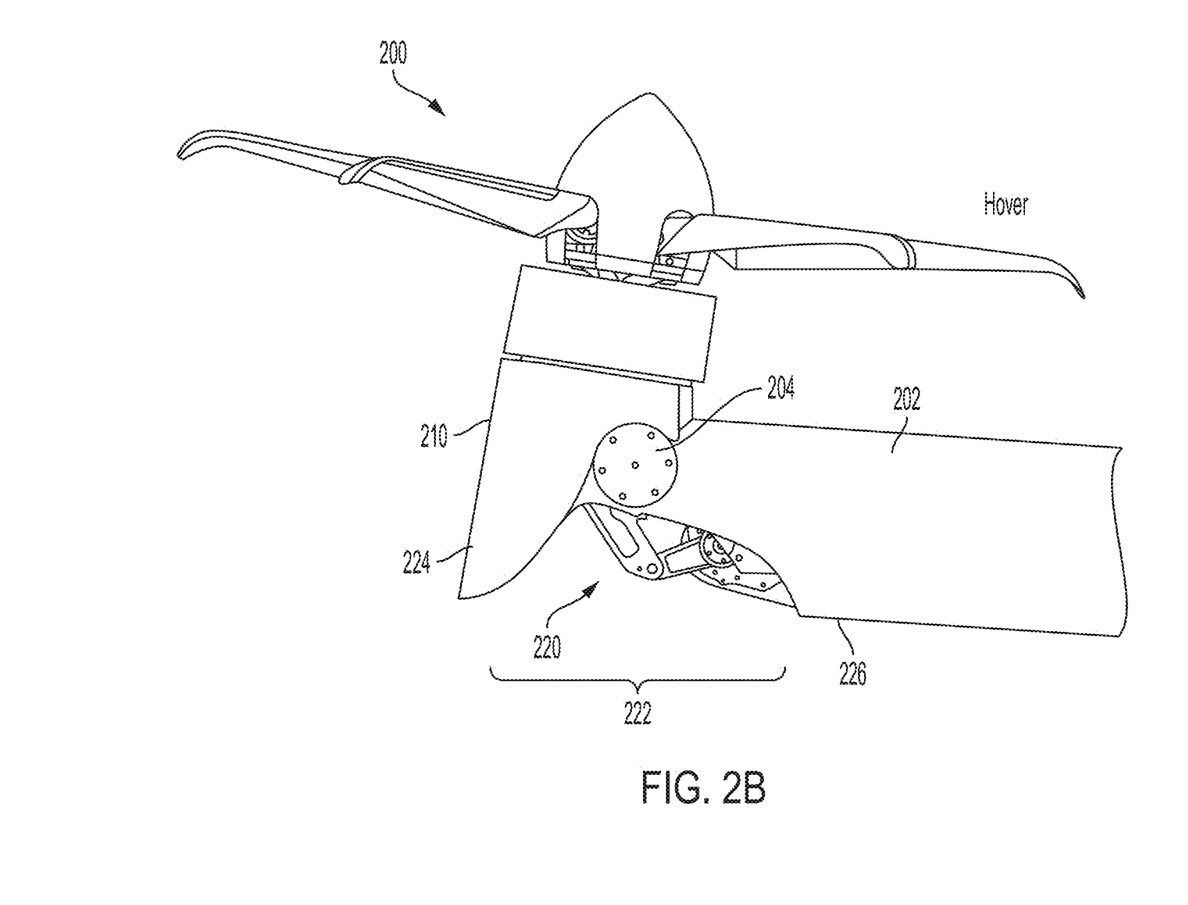

FIGS. 2A and 2B illustrate aspects of the mounting of a proprotor, such as proprotor 114, to a boom, such as boom 122, according to various embodiments. FIG. 2A illustrates proprotor 200 in a forward thrust orientation, which is the position of the proprotor 200 during the cruise phase of flight. Proprotor 200 is mounted to a boom 202 at a joint 204 that is located at a forward end of the boom 202. Proprotor 200 includes a rotor assembly 206 that is mounted to a mount 208, which provides the proprotor portion of the joint 204. The mount 208 can include a shell 210 that aligns with the outer contour of the boom for improved aerodynamics. The rotor assembly 206 can include a motor 212 mounted to the mount 208 and a plurality of blades 214 connected to a hub that is connected to a rotor shaft of the motor 212. In the illustrated embodiment, the rotational axis 205 of the joint 204 is offset from the centerline 217 (rotational axis) of the rotor assembly 206. Although the discussion below refers to a proprotor mounted to the front end of a boom, various embodiments include mounting a proprotor to the aft end of the boom and tilting the proprotor with a tilt mechanism as discussed further below.

FIG. 2B illustrates proprotor 200 in a vertical thrust orientation. Relative to the orientation shown in FIG. 2A, proprotor 200 has tilted about joint 204 via a tilt mechanism 220 that extends between the boom 202 and the mount 208. As explained in more detail below, tilt mechanism 220 is configured to provide the tilting power and stiffness required for controlling the tilt of the proprotor during operation while being compact and lightweight. As illustrated in FIG. 2B, the mount 208 can be configured such that when the proprotor 200 is in the vertical thrust orientation, an opening 222 is created between the lower portion 224 of the mount shell 210 and the lower portion 226 of the boom 202 that can allow easy access to the tilt mechanism 220 for inspection, repair, and replacement, which can reduce aircraft downtime and increase aircraft utilization. According to various embodiments, the tilt mechanism 220 can be completely replaced through the opening 222 without requiring disassembly of any portion of the shell of the mount 208 or the shell of the boom.

Figure 2C:
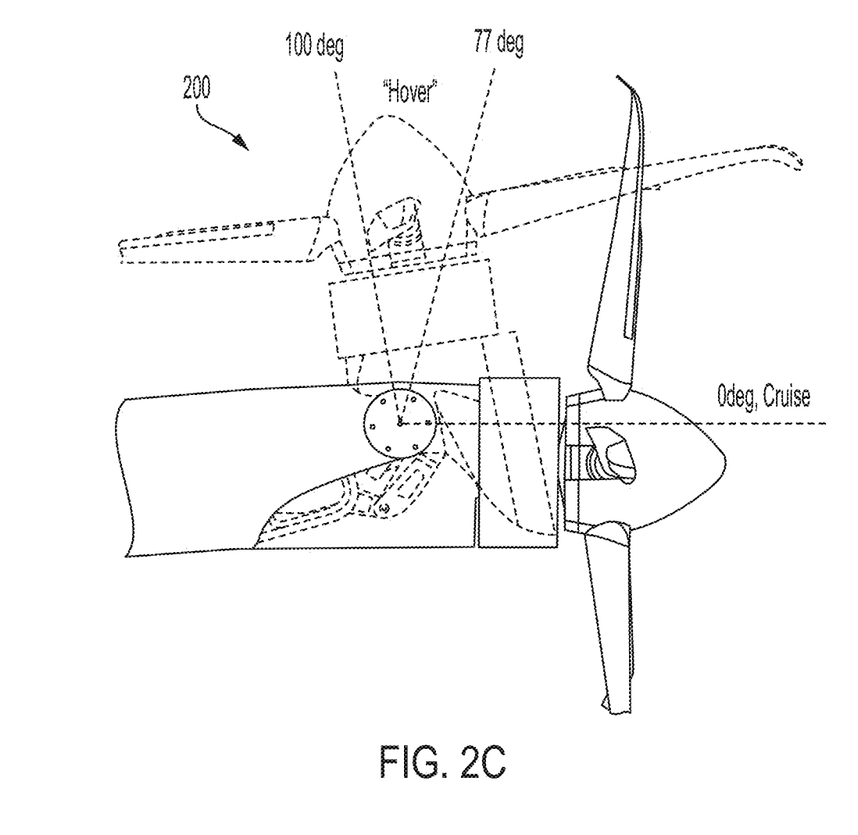
FIG. 2C illustrates a range of motion of a proprotor, according to various embodiments.

FIG. 2C illustrates a range of motion of the proprotor 200, according to various embodiments. The proprotor 200 can tilt from a 0 degree orientation used during cruise to a tilt of at least 90 degrees used during hover. In the illustrated embodiment, the proprotor can tilt past 90 degrees, such as to 100 degrees. In some embodiments, the tilt of the proprotor when the proprotor is in the vertical thrust orientation (used for hover and vertical take-off and landing) can be in a range of tilt angles, such as from 77 degrees to 100 degrees as illustrated in FIG. 2C. According to various embodiments, fine tilt adjustments can be made when the proprotor is in the vertical thrust orientation to control the position and orientation of the aircraft. According to various embodiments, tilt mechanisms according to the principles described herein provide the stiffness and responsiveness required for fine and accurate tilt adjustments.

Figure 3:
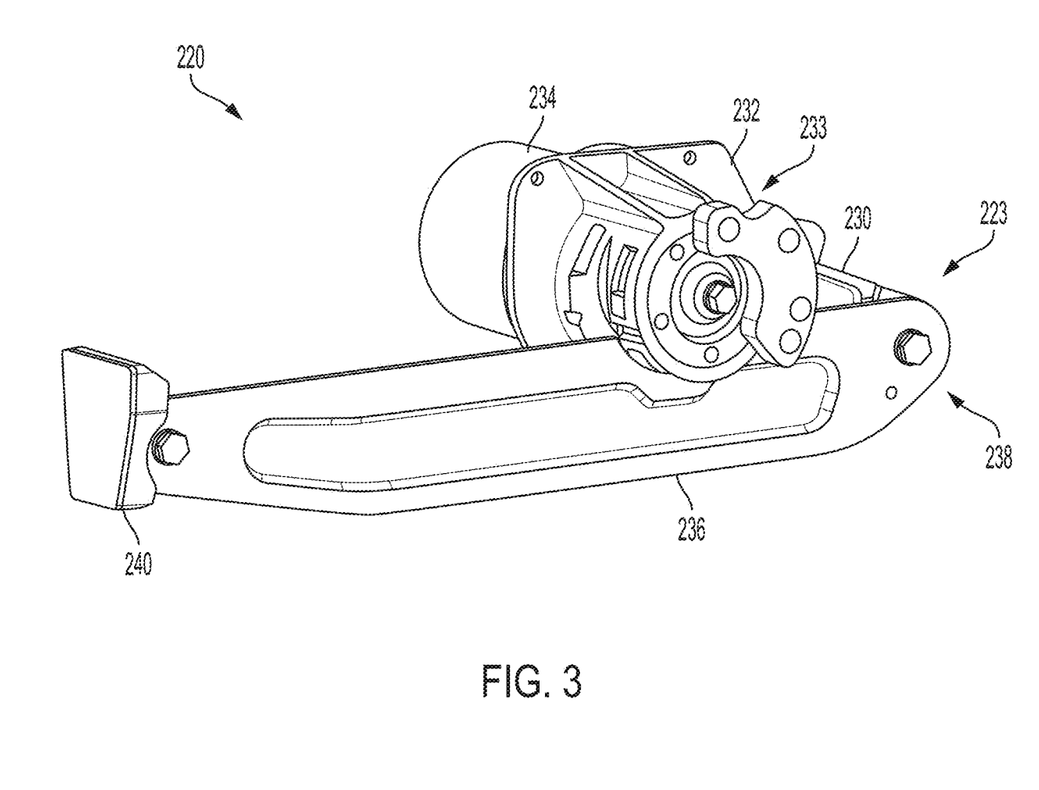
FIG. 3 illustrates an example of a tilt mechanism for tilting a proprotor, according to various embodiments.

The tilt mechanism 220 includes a multi-link assembly that extends from the boom 202 to the mount 208 and is driven by a rotary actuator. An example of a tilt mechanism 220, according to various embodiments, is shown in more detail in FIG. 3. The illustrated tilt mechanism 220 includes a two-link assembly 223 that includes a crank arm 230 and coupler arm 236. The crank arm 230 is rotatably mounted to a linkage mount 232 at a joint 233. The linkage mount 232 mounts the tilt mechanism 220 to the boom 202. The crank arm 230 is coupled to a rotary actuator 234, such as via a splined engagement. The rotary actuator 234 drives rotation of the crank arm 230 and can be controlled to position the crank arm 230 in any desired rotational position within an operating range. The coupler arm 236 is rotatably connected at a first end to the crank arm 230 at a joint 238 and rotatably connected at a second end to a bracket 240 that connects the tilt mechanism 220 to the mount 208. FIG. 3 illustrates the tilt mechanism 220 in a retracted position which positions the proprotor 200 in the forward thrust orientation that may be used for cruise. According to various embodiments, in the retracted position, the joint 238 between the crank arm 230 and coupler arm 236 is positioned rearward of the joint 233 between the crank arm 230 and linkage mount 232. Although only two links are shown in the illustrated embodiment, various embodiments can include more than two links, including embodiments that have three links, four links, and five links. According to various embodiments, two links is preferable for increased stiffness, which improves stability and positional accuracy of the proprotor, improves tilt actuation response time, decreases complexity, increases compactness, and decreases weight.

Figure 4A:
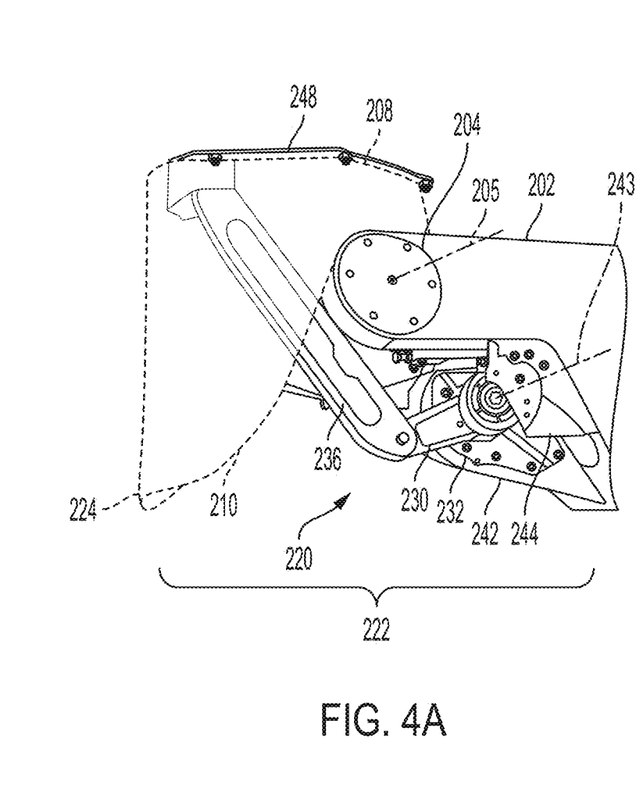
FIGS. 4A and 4B illustrate aspects of the mounting of a tilt mechanism to a boom and mount, according to various embodiments.
Figure 4B:
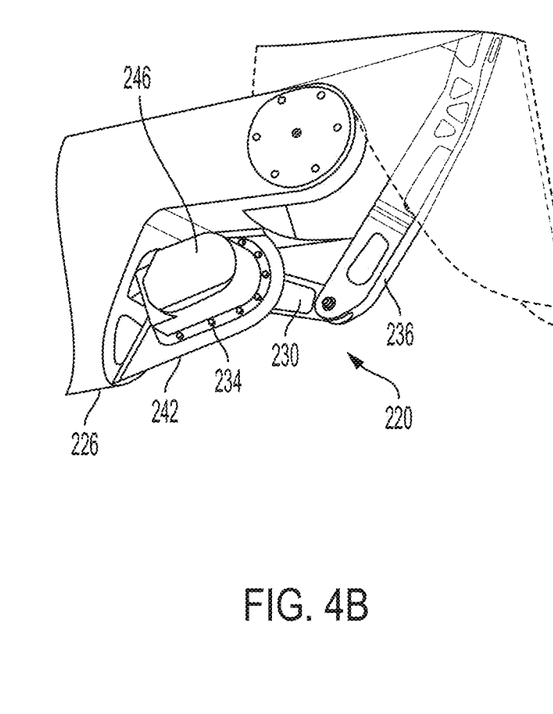

FIGS. 4A and 4B illustrate aspects of the mounting of the tilt mechanism 220 to the boom 202 and mount 208, according to various embodiments. In FIGS. 4A and 4B, the mount 208 is in a tilted position and the tilt mechanism 220 is in an extended position. The linkage mount 232 is mounted to a support structure 242 of the boom 202. According to various embodiments, a bracket 244 can be provided opposite the support structure 242 for providing additional support for the tilt mechanism 220. In the illustrated embodiment, the rotary actuator 234 is mounted to an opposite side of the support structure 242 from the linkage mount 232. A shaft (not shown) of the rotary actuator 234 may extend through an opening of the support structure 242 to couple with the crank arm 230 providing a driven rotational axis 243 that is offset from the rotational axis 205 of the joint 204. The rotary actuator 234 includes an electric motor and can include a gearbox. In the illustrated embodiment, the motor and gearbox are packaged together within a housing 246. In some embodiments, the motor and gearbox may be packaged separately, such as to facilitate individual replacement.

The bracket 240 (see FIG. 3) at the end of the coupler arm 236 may be mounted to a mounting plate 248 of the mount 208. According to various embodiments, the rotor assembly 206 may be mounted to an opposite side of the mounting plate 248. Rotation of the crank arm 230 via actuation of the rotary actuator 234 causes the tilt mechanism 220 to extend and apply a force to the mounting plate 248 at the mounting point of the bracket 240. This force is eccentric with respect to the axis 205 of the joint 204 between the mount 208 and the boom 202, which causes the mount 208 (and attached rotor assembly 206) to tilt upward.

As noted above, an opening 222 is created between the lower portion 224 of the mount shell 210 and the lower portion 226 of the boom 202, which allows easy access to the tilt mechanism 220 from below and to the sides. This is facilitated in part by the eccentricity of the axis 205 of the joint 204 relative to the rotor assembly 206 centerline as well as by the lower portion 224 of the mount shell 210 extending rearwardly of the joint 204.

Figure 5A:
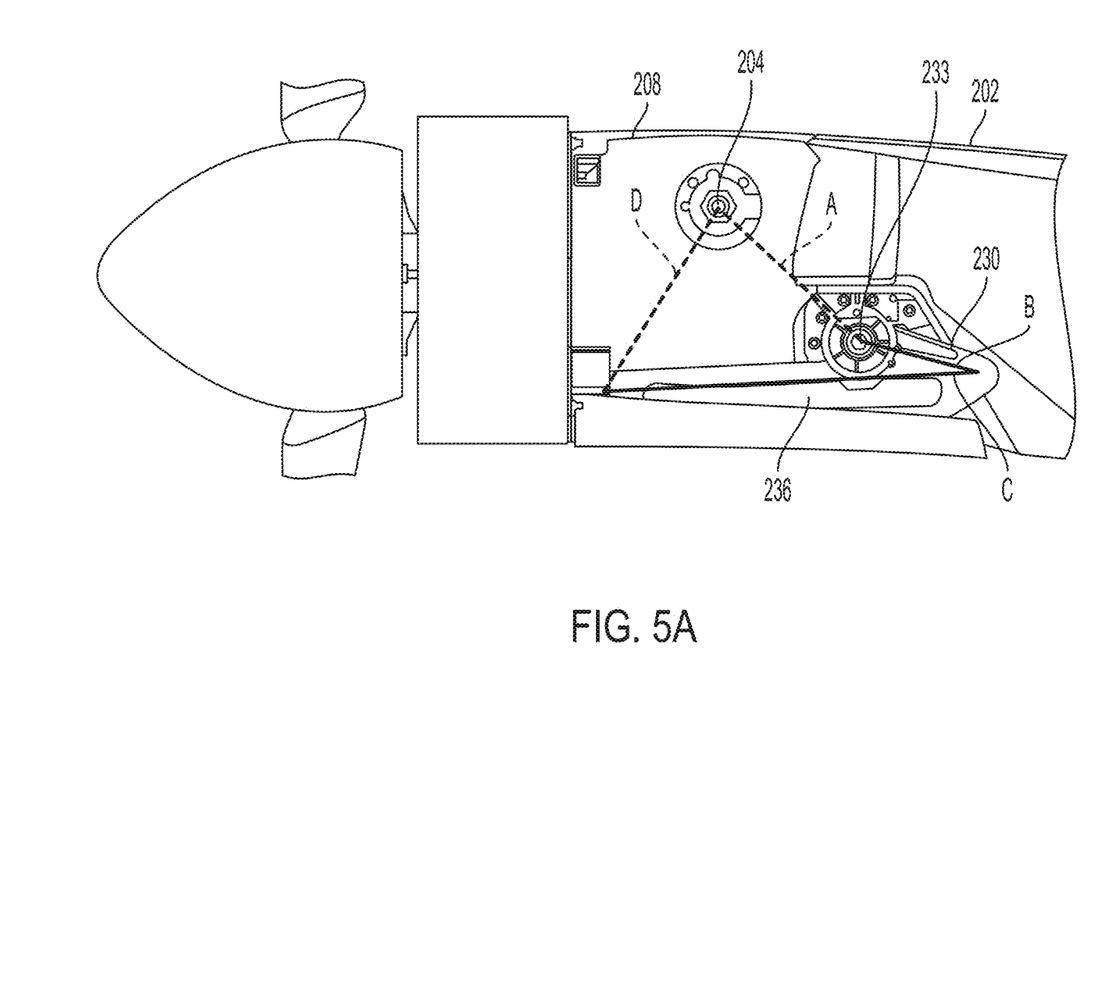
FIGS. 5A and 5B illustrate the configuration of a four-bar linkage in the forward thrust and vertical thrust orientations, respectively, according to various embodiments.
Figure 5B:
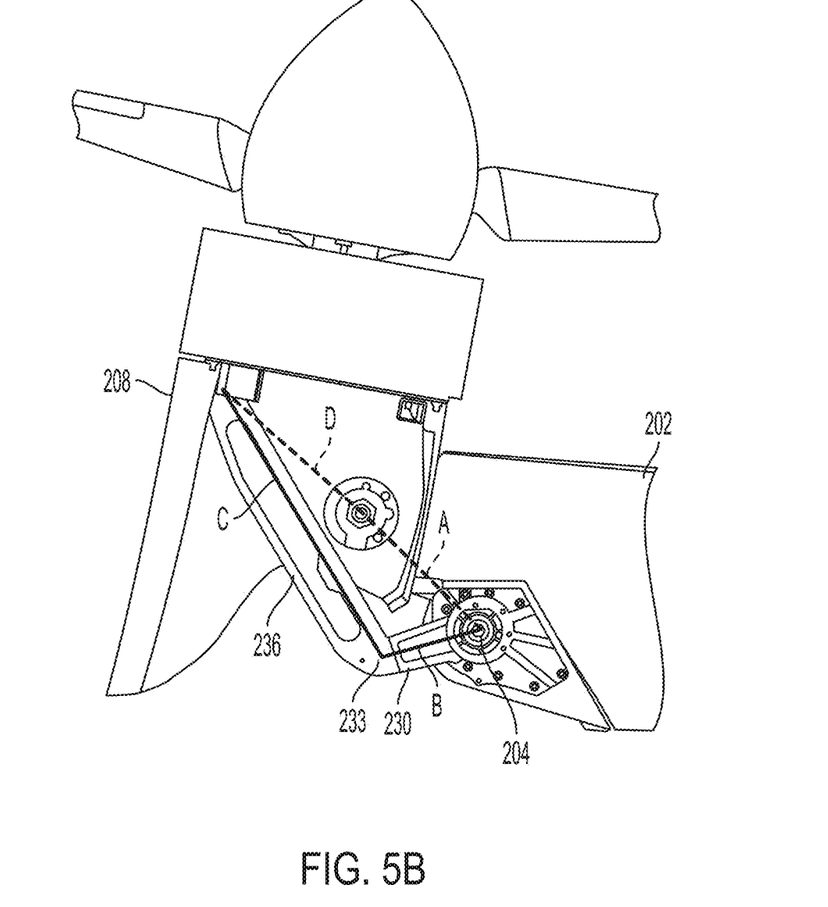

According to various embodiments, the tilt mechanism 220 in combination with the jointed coupling of the mount 208 to the boom 202 effectively forms a four-bar linkage. (Only the crank arm and coupler arm are actually bars. The other two "bars" of the four-bar linkage are the complex structure between the respective joints, as explained further below.) This four-bar linkage design provides a number of advantages, including a large range of motion, a mechanical advantage that reduces the actuator torque requirements, and improved stiffness. FIGS. 5A and 5B illustrate the configuration of the four-bar linkage in the forward thrust and vertical thrust orientations, respectively, according to various embodiments. As indicated by the dashed lines in FIGS. 5A and 5B, a first bar ("A") of the four-bar linkage is the structure of the boom 202 extending from the joint 204 to the joint 233 (the joint between the crank arm 230 and linkage mount 232). The crank arm 230 is the second bar ("B"), the coupler arm 236 is the third bar ("C"), and the structure of the mount 208 extending from the joint 204 to the connection of the coupler arm 236 to the mount 208 is the fourth bar ("D"). Although bars A and D are shown as simple lines, it is to be understood that this is a simplification used for illustrating the principles of the design and the actual structure is more complex. FIG. 5A illustrates the positions of the bars when the proprotor is in the forward thrust orientation for cruise and FIG. 5B illustrates the positions of the bars when the proprotor is in the vertical thrust orientation for hover.

According to various embodiments, the four-bar linkage provides variable mechanical advantage throughout its range of motion. According to various embodiments, the four-bar linkage provides the highest mechanical advantage when the proprotor is at 0 degrees tilt—the forward thrust orientation. The high mechanical advantage in this position can reduce the loads on any lockout or braking mechanism used to lock the proprotor in its cruise position without requiring active control by the rotary actuator. This high mechanical advantage may be provided by minimizing the angle between the crank arm 230 and coupler arm 236 without approaching too closely to the nonlinearity position of 0 degrees between the crank arm 230 and coupler arm 236. According to various embodiments, the angle between the crank arm 230 and coupler arm 236 when the proprotor is in the 0 degrees tilt position is no greater than 30 degrees, preferably no greater than 20 degrees, more preferably no greater than 10 degrees. In some embodiments, the angle between the crank arm 230 and coupler arm 236 when the proprotor is in the 0 degrees tilt position is 5-15 degrees.

The four-bar linkage may be configured to limit the mechanical advantage in hover to meet system stiffness and positional accuracy constraints in hover—when the tilt of the proprotor may be actively controlled and continuously adjusted. According to various embodiments, the mechanical advantage in hover is no greater than 10:1, no greater than 8:1, no greater than 6:1, no greater than 5:1, or no greater than 4:1. Preferably, the mechanical advantage in hover is no greater than 6:1. According to various embodiments the ratio of the length of the coupler arm 236 to the length of the crank arm 230 is maximized while still meeting the position accuracy requirements. According to various embodiments the mechanical advantage varies throughout its operational range between 2:1 and 6:1.

Figure 6:
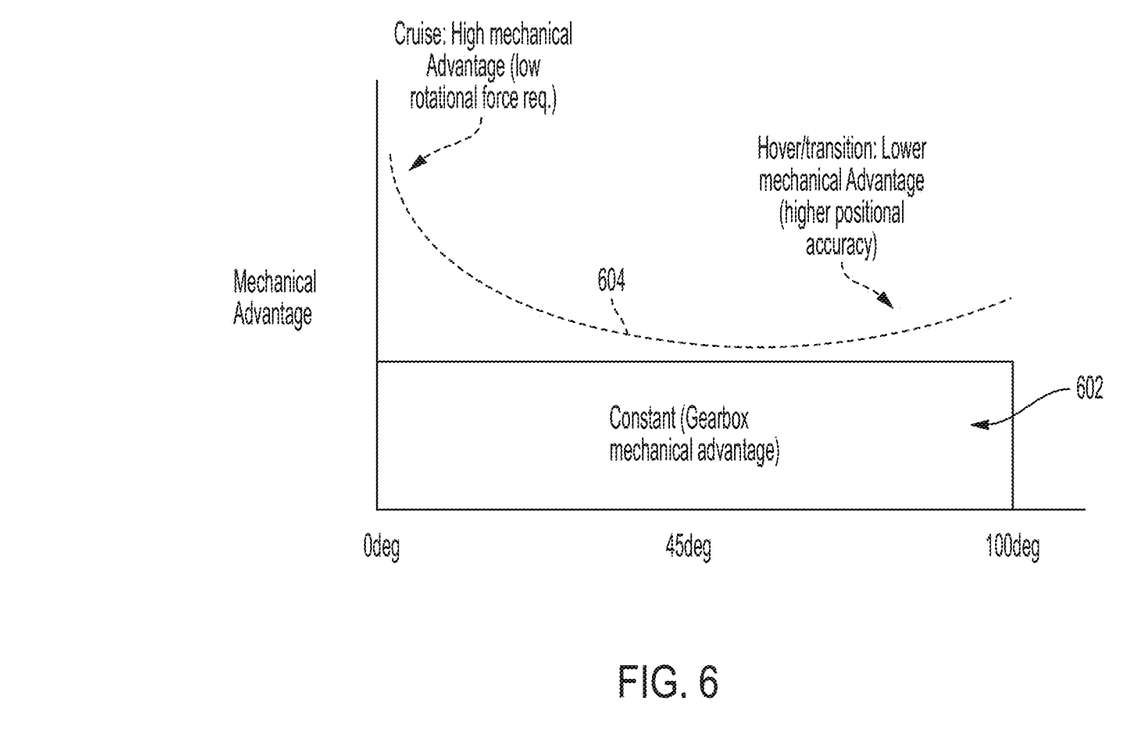
FIG. 6 illustrates an exemplary mechanical advantage curve provided by a tilt mechanism, according to various embodiments.

FIG. 6 illustrates an exemplary mechanical advantage curve provided by the tilt mechanism. The y-axis is the mechanical advantage and the x-axis is the tilt position of the proprotor, with 0 degrees representing the forward thrust orientation of the proprotor used during cruise. A constant mechanical advantage is provided by the gearbox of the rotary actuator which is indicated by region 602. Line 604 is the variable mechanical advantage provided by the four-bar linkage, according to various embodiments. As illustrated, the highest mechanical advantage may be provided at 0 degrees tilt, with the second highest mechanical advantage provided at the high end of the tilt range when the proprotor is in a hover orientation—100 degrees in this example. The lower mechanical advantage in hover relative to cruise provides relatively higher positional accuracy, which may be advantageous when actively controlling the tilt of the proprotors for controlling the aircraft in hover.

As noted above, the tilt position of the proprotor may be actively controlled in hover—i.e., the rotary actuator may be controlled to move the proprotor to a desired position and hold it there. In some embodiments, the tilt position of the proprotor in cruise may not be actively controlled, which can reduce power draw. In some embodiments, a brake may be provided to lock the tilt mechanism 220 in the cruise position. In some embodiments, the brake is a fail-safe brake that engages when power is removed, which can reduce energy draw requirements. In some embodiments, the brake may be provided at the joint 233 between the crank arm 230 and linkage mount 232. In some embodiments, the brake is incorporated into the rotary actuator 234. In some embodiments, a mechanical tilt limiter is provided for defining the cruise position of the proprotor. The proprotor may be tilted down until the tilt limiter is engaged and the brake may then be applied to lock the tilt mechanism 220 in place.

Figure 7:
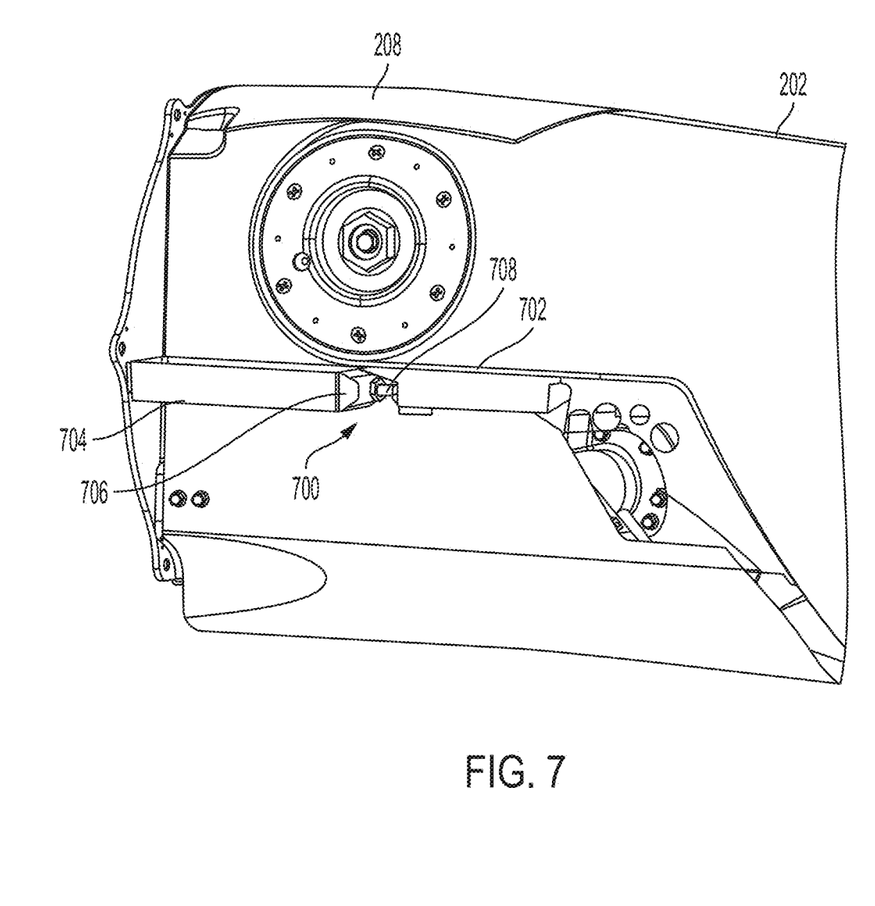
FIG. 7 illustrates an embodiment of a tilt limiter that defines the 0 degree tilt position of the proprotor.

FIG. 7 illustrates an embodiment of a tilt limiter 700 that defines the 0 degree tilt position of the proprotor. Tilt limiter 700 includes a first block 702 mounted to the boom 202 and a second block 704 mounted to the mount 208. One of the first block 702 and second block 704 may have a striker plate 706 and the other may have a bolt 708 or other suitable structure for contacting the striker plate 706. When the proprotor is moved to its 0 degree cruise position, the rotary actuator of the tilt mechanism may drive retraction of the link assembly until the bolt 708 is engaged with the striker plate 706, at which point a brake may be engaged. In some embodiments the rotary actuator applies a preload after contact of the bolt 708 is engaged with the striker plate 706 to ensure positional accuracy and to prevent a gap from forming at the joint under load in the cruise position with the brake engaged.

Figure 8:
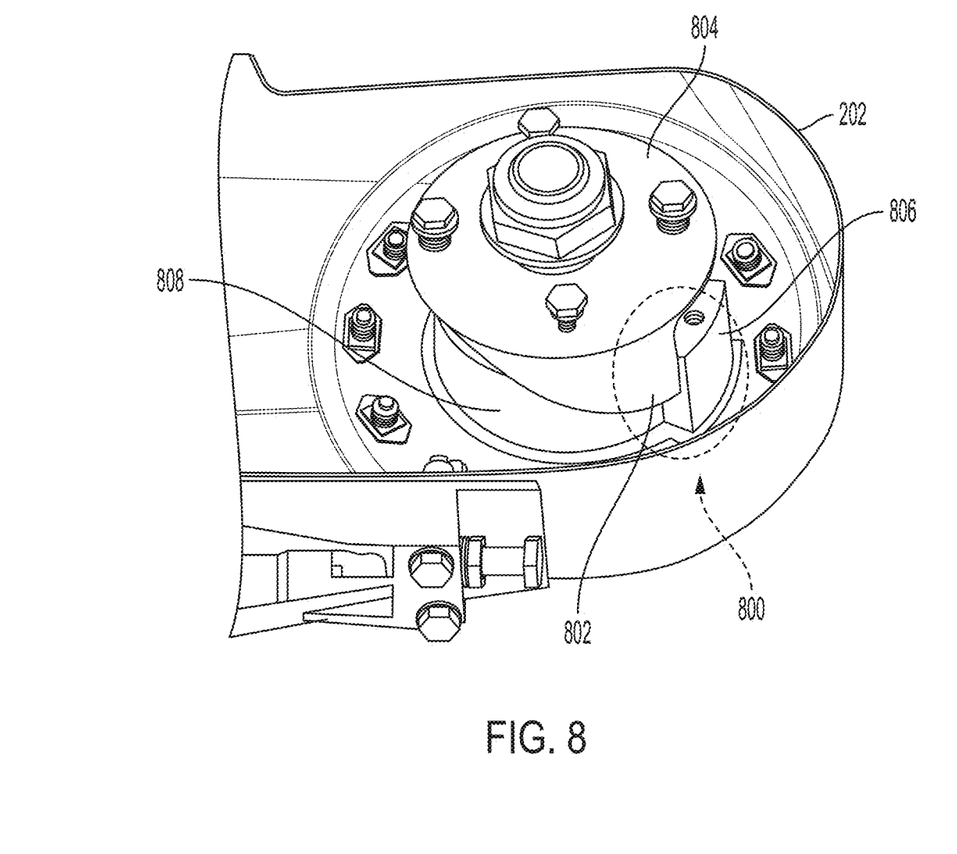
FIG. 8 illustrates an example of a maximum tilt limiter that may mechanically limit the maximum tilt of the proprotor.

FIG. 8 illustrates an example of a maximum tilt limiter 800 that may mechanically limit the maximum tilt of the proprotor. According to various embodiments, the tilt limiter 800 includes first stop 802 that may be provided on a pivot flange 804 of the mount 208. The pivot flange 804 and first stop 802 rotate along with the mount 208. The tilt limiter includes a second stop 806 that may be provided on the boom 202, such as on collar 808. Engagement of the first stop 802 with the second stop 806 defines the maximum tilt of the proprotor. In some embodiments, the stop is set such that the mechanical limit of tilting is beyond the operational limit of tilting so that the mechanical tilt limiter does not interfere with the active tilt control in hover.

Figure 9:
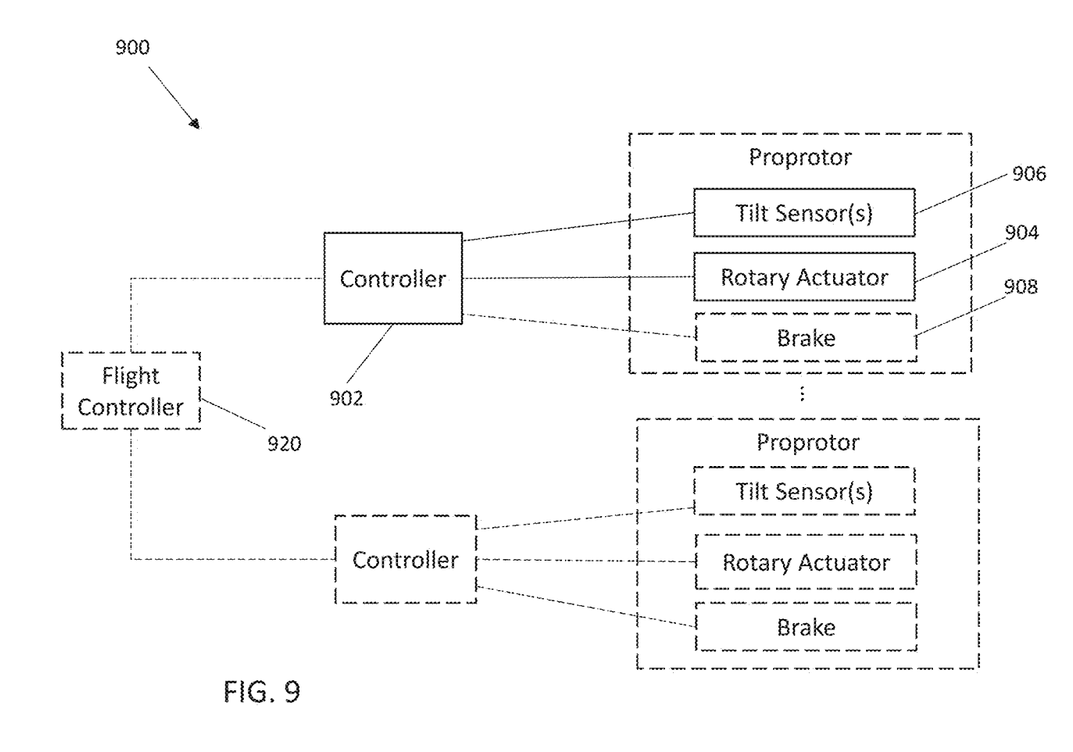
FIG. 9 is a functional block diagram of a system for controlling tilting of one or more proprotors, according to various embodiments.

FIG. 9 is a functional block diagram of a system 900 for controlling tilting of one or more proprotors, such as proprotors 114 of FIGS. 1A and 1B and proprotor 200 of FIGS. 2A and 2B, according to various embodiments. System 900 includes a controller 902 that includes one or more processors configured and programmed for controlling the rotary actuator 904 (e.g., rotary actuator 234 of FIG. 3) to adjust the tilt of the proprotor. The controller 902 receives rotational position signals from one or more sensors 906 located at the proprotor. In some embodiments, one or more sensors 906, such as one or more encoders, are located at the joint between the proprotor mount and the boom (e.g., joint 204 of FIGS. 2A and 2B). According to some embodiments, the controller 902 actively controls the position of the proprotor during hover by sending control signals to the rotary actuator 904 based on rotational position signals received from the sensor(s) 906. According to some embodiments, the controller 902 sends a signal to a brake system 908 of a proprotor to lock the rotary actuator in a fixed position, such as in the forward thrust position for cruise, such that the tilt of the proprotor is passively controlled. The controller 902 may cease actively controlling the position of the proprotor until the controller 902 is instructed to adjust the tilt of the proprotor. In some embodiments, the brake system 908 engages when power is removed from the actuator and/or controller 902.

In some embodiments, a controller 902 controls the tilting of multiple proprotors. In some embodiments, a separate controller 902 is provided for each proprotor. Proprotor tilt position commands may be provided to a controller 902 of a respective proprotor by a flight controller 920. The controller 902 may control the rotary actuator to achieve the commanded tilt position based on the signals from the one or more sensors 906.

Aircraft according to the principles discussed above can be configured to carry at least one person and up to 10 people, preferably up to 6 people, and more preferably up to 4 people. According to some embodiments, the aircraft is configured to be piloted and includes piloting controls. In some embodiments, the aircraft is configured to operate autonomously without any onboard pilot and with or without one or more passengers.

According to some embodiments, the aircraft is configured to carry up to 6 people (for example, a pilot and up to 5 passengers) up to 75 miles at a cruising speed of up to 150 miles per hour at an altitude of up to 3,000 feet above ground. In some embodiments, the aircraft is configured for 5 people, such as one pilot and four passengers. According to various embodiments, the maximum range on a single battery pack full charge is 25 miles, 50 miles, 75 miles, 100 miles, or 200 miles.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A rotor mounting assembly for a vertical take-off and landing aircraft comprising:
   a boom configured for mounting to a wing of the aircraft;
   a mount for mounting a rotor assembly, the mount connected to the boom at a joint and tiltable about the joint from a forward thrust orientation in which the rotor assembly can provide forward thrust for forward flight to a vertical thrust orientation in which the rotor assembly can provide vertical thrust for vertical take-off and landing and hover, wherein the joint directly connects an upper portion of an end of the boom to an upper portion of the mount;
   a multi-link assembly extending from the boom to the mount; and
   a rotary actuator for actuating the multi-link assembly to control tilting of the mount.

2. The rotor mounting assembly of claim 1, wherein the multi-link assembly is configured to have a mechanical advantage that is highest when the mount is in the forward thrust orientation.

3. The rotor mounting assembly of claim 1, wherein the multi-link assembly comprises a crank arm rotatably connected to the actuator and a coupler arm mounted to the mount, and wherein the crank arm is shorter than the coupler arm.

4. The rotor mounting assembly of claim 3, wherein the crank arm extends rearward of a connection between the crank arm and the actuator when the mount is in the forward thrust orientation and forward of the connection between the crank arm and the actuator when the mount is in the vertical thrust orientation.

5. The rotor mounting assembly of claim 1, wherein the rotor mounting assembly is configured so that a rotational axis of the joint is positioned above a rotational axis of the rotor assembly when the rotor assembly is mounted to the mount.

6. The rotor mounting assembly of claim 1, wherein the mount comprises a shell that aligns with the boom when the mount is in the forward thrust orientation, the shell is spaced from the boom when the mount is in the vertical thrust orientation, and the multi-bar linkage can be accessed through the spacing between the shell and the boom.

7. The rotor mounting assembly of claim 1, comprising a rotational position sensor located at the joint.

8. The rotor mounting assembly of claim 1, wherein a range of tilt of the mount about the joint is at least 90 degrees.

9. The rotor mounting assembly of claim 1, wherein the actuator comprises a gear box.

10. The rotor mounting assembly of claim 1, comprising at least one mechanical stop positioned at the joint for limiting a tilt range of the mount.

11. The rotor mounting assembly of claim 10, wherein the at least one mechanical stop comprises at least one first mechanical stop to limit upward tilt of the mount and at least one second mechanical stop to limit downward tilt of the mount.

12. The rotor mounting assembly of claim 1, comprising the rotor assembly.

13. A vertical take-off and landing aircraft comprising the rotor mounting assembly of claim 1.

14. The aircraft of claim 13, wherein the boom is mounted to the wing.

15. The aircraft of claim 14, comprising a control system for controlling tilt of the mount, wherein the control system actively controls the tilt of the mount when the mount is in the vertical thrust orientation.

16. The aircraft of claim 13, wherein the rotor assembly is mounted to a forward end of the boom and an aft rotor assembly is non-tiltably mounted to the aft end of the boom.

17. A method of controlling a vertical take-off and landing aircraft comprising:
controlling tilt of a rotor assembly between a forward thrust orientation in which the rotor assembly can provide forward thrust for forward flight and a vertical thrust orientation, wherein the rotor assembly is mounted to a mount that is connected to a boom of the aircraft at a joint, and the tilt is controlled by actuating a rotary actuator coupled to a multi-link assembly that extends from the boom to the mount, and wherein the joint directly connects an upper portion of an end of the boom to an upper portion of the mount.

18. The method of claim 17, wherein the tilt of the rotor assembly is controlled based on an output from at least one rotational sensor located at the joint.

19. The method of claim 17, comprising actively controlling the tilt of the rotor assembly during hover.

20. The method of claim 19, comprising locking the tilt of the rotor assembly during cruise.

21. The rotor mounting assembly of claim 1, wherein the multi-link assembly is in an extended position when the mount is in the vertical thrust orientation and in a retracted position when the mount is in the forward thrust orientation.

* * * * *